Figure 4:
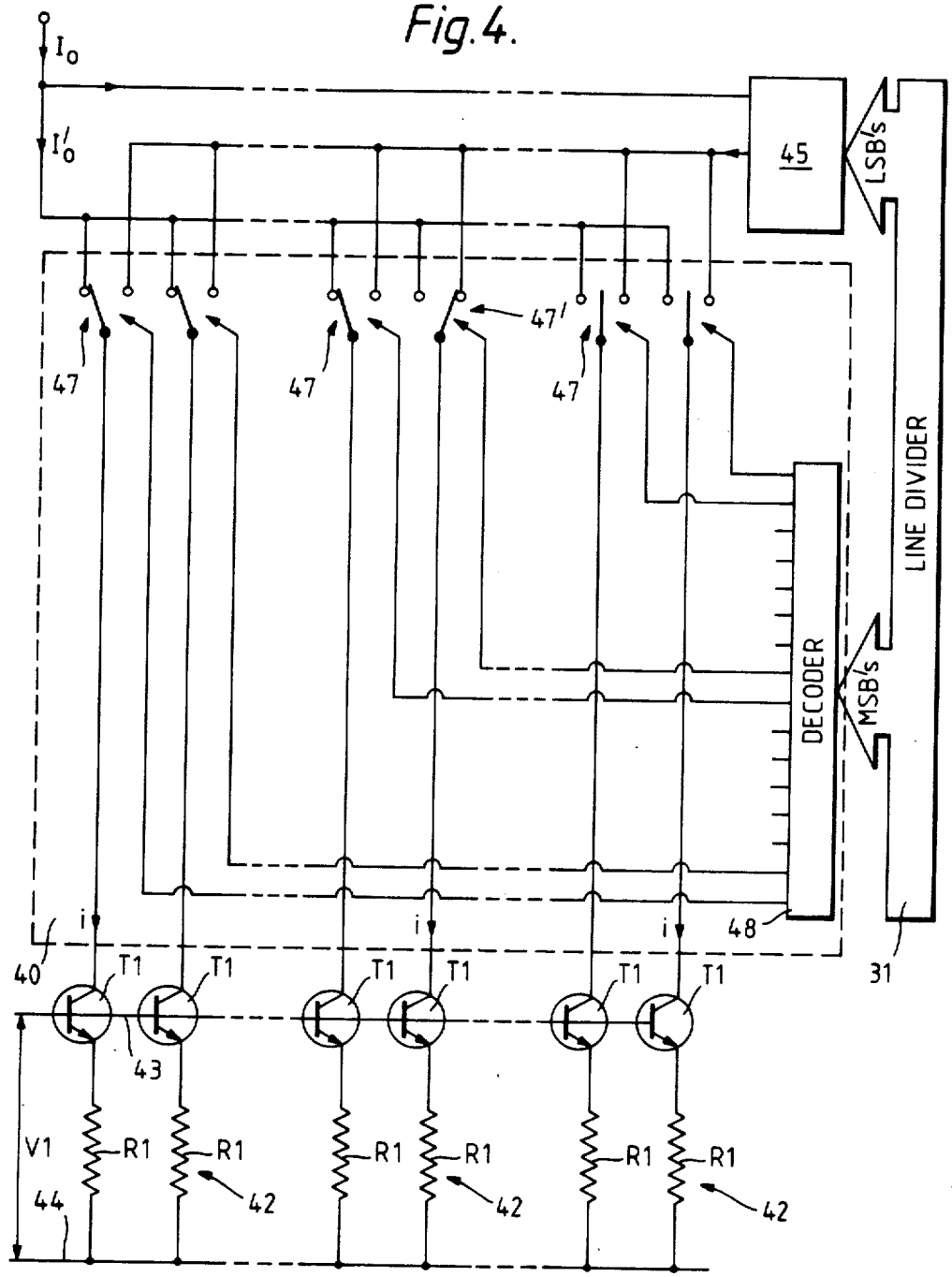

United States Patent [19]

Mallinson et al.

[11] Patent Number: 4,682,086
[45] Date of Patent: Jul. 21, 1987

[54] CATHODE RAY TUBE DISPLAY SYSTEMS

[75] Inventors: Andrew M. Mallinson, Salem, N.H.; Adrian H. W. Hoodless, Radwell, England

[73] Assignee: Ferranti, plc, Cheshire, England

[21] Appl. No.: 650,642

[22] Filed: Sep. 14, 1984

[30] Foreign Application Priority Data

Sep. 15, 1983 [GB] United Kingdom ............... 8324712

[51] Int. Cl.$^4$ ............... H01J 29/56; H01J 29/70; H01J 29/72
[52] U.S. Cl. ............... 315/371; 315/366; 315/367; 313/422
[58] Field of Search ............... 315/366, 367, 370, 371, 315/403; 313/422

[56] References Cited

U.S. PATENT DOCUMENTS 3,437,874  4/1969  Cressey et al. ............... 315/367
3,718,834  2/1973  Bacon et al. ............... 315/367

OTHER PUBLICATIONS

Pearson, "Analog Controlled Constant Velocity Deflection", IBM Tech. Disc. Bull., vol. 9, No. 2, Jul. 1966.

Primary Examiner—Theodore M. Blum
Assistant Examiner—Gregory C. Issing
Attorney, Agent, or Firm—Kerkam, Stowell Kondracki & Clarke

[57] ABSTRACT

A CRT display system providing a raster pattern has digital means 30, 31, 32 to drive a DAC 34. In response, there are supplied analogue signals, on a line 37. There are also provided pulse generating means 90 controlled by the digital means, and integrating means comprising two integrators. Each integrator is connected individually to an X deflection plate 14 of the CRT, and comprises an amplifier and a feedback capacitor. One capacitor C2 is charged by negative-going pulses, and the other capacitor C2' is charged by positive-going pulses, until the pulses are removed, when the required ramps are applied to the deflection plates. Then a current flows through a transistor T7, and is controlled by the DAC output on the line 37. Hence, the waveforms applied to the deflection plates cause distortion of the raster pattern otherwise obtained, to be corrected, the DAC output representing a function comprising the inverse of the function representing the distortion.

10 Claims, 9 Drawing Figures

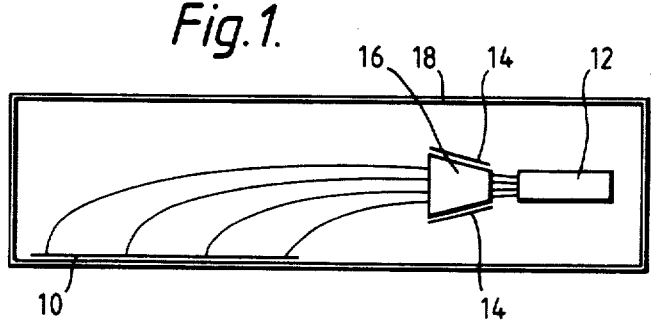
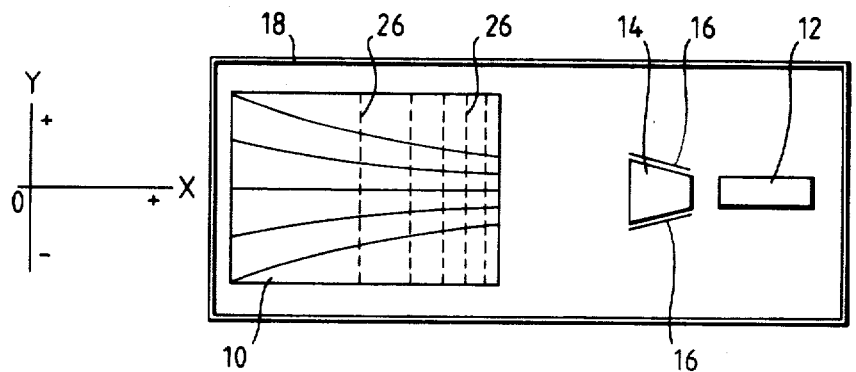
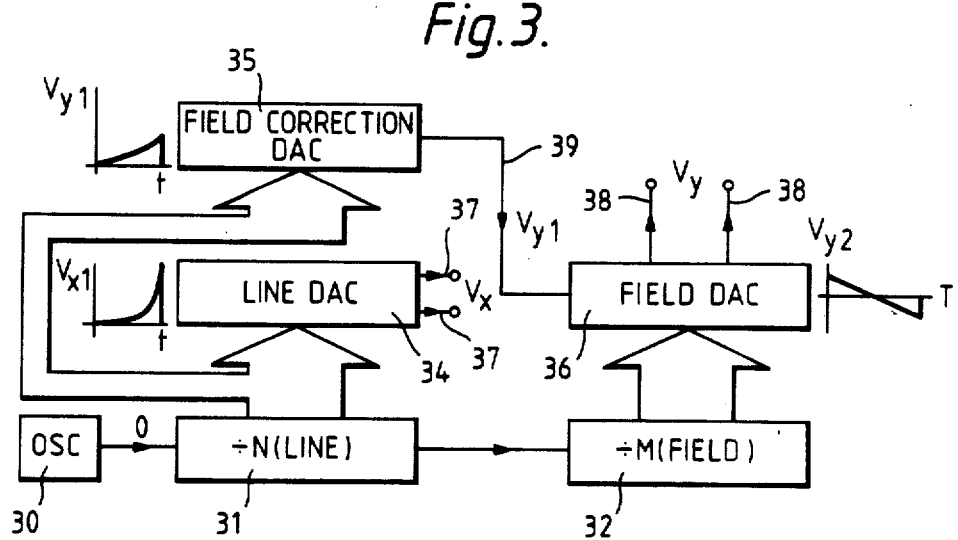

CATHODE RAY TUBE DISPLAY SYSTEMS

This invention relates to cathode ray tube display systems, and in particular, although not exclusively, to such systems each employing a so-called flat screen cathode ray tube (CRT), having an electron beam gun assembly extending parallel to the plane of a rectangular shaped CRT screen, in a plane only displaced by a small distance from the screen plane, the electron beam gun assembly when viewed together with the screen, with the CRT screen being viewed in plan, being displaced laterally from the CRT screen, and any required display is provided on the rectangular shaped CRT screen by the electron beam scanning over the screen with a conventional raster scan pattern. Such a flat screen CRT display system may comprise a television (TV) receiver; or an information display system, to display in an observable form information embodied within signals supplied to the display system, the signals supplied being of a form suitable to drive the display system in the required way.

In general, the present invention relates to any form of CRT display system in which means is required to be provided to correct for any form of distortion, otherwise obtained, for the raster scan pattern. However, only a flat screen CRT display system is referred to in this specification.

For a CRT display system not having the flat screen construction it is conventional to provide the required raster scan pattern by applying deflection signals in the form of linear-portion saw-tooth waveforms to the deflection plates, the desired saw-tooth waveforms being generated, possibly, solely by analogue means.

Inherently with the particular construction of a flat screen CRT display system referred to above, if such linear-portion saw-tooth waveforms are applied to the deflection plates, a distorted raster scan pattern, having a truncated fluted shape, is provided in relation to the flat screen CRT. For example, with the electron gun assembly extending parallel to an extension of the longitudinal axis of symmetry of the screen, the longitudinal axis of symmetry of the flute shaped raster pattern is coincident with the longitudinal axis of symmetry of the CRT screen.

It is known to correct for such truncated, flute shaped distortion of the raster scan pattern for a flat screen CRT display system by applying to the deflection plates appropriately non-linear portion saw-tooth waveforms generated solely by analogue means, and so that the provided raster scan pattern is coincident with, at least substantially, without distortion, having the same size, and shape as, the rectangular shaped CRT screen.

In particular, the present invention relates to a CRT display system in which distortion of the raster scan pattern, otherwise produced, is compensated for by employing distortion correction means for the CRT including digital means to drive digital to analogue converters DAC's, the DAC's being arranged to generate functions to shape the waveforms of the deflection signals to be applied to the X and Y deflection plates of the CRT, in the way required to compensate for the raster pattern distortion, the analogue output of one DAC partially causes the deflection signals to be applied to the X deflection plates to cause each raster line scan, and the analogue output of another DAC being applied to the Y deflection plates, the digital means being arranged to provide digital output signals to the DAC's, and, in response, the DAC's each providing an analogue output.

It is an object of the present invention to provide such a CRT display system, and in particular a flat screen CRT display system, in which the analogue output of said one DAC is applied to the X deflection plates via integrating means, the integrating means to provide sawtooth waveforms to cause each raster line scan in an uncompensated form, the analogue output of said one DAC causing the required compensating factor to be applied to the sawtooth waveforms.

According to the present invention a cathode ray tube (CRT) display system includes distortion correction means for the CRT having digital means arranged to provide digital output signals to drive at least a first digital-to-analogue converter (DAC). In response, the DAC is arranged to generate a function, to shape the waveforms of deflection signals to be applied to one pair of deflection plates of the CRT and thereby cause a conventional raster scan pattern to appear on the CRT screen. The digital means provides digital output signals and the DAC is responsive to the digital output signals to generate the function, representative of variations of the corresponding analogue output from the DAC. The analogue output of the DAC is applied to the associated pair of deflection plates of the CRT via integrating means. The integrating means includes two integrators, each integrator including an amplifier and a feedback capacitor. The system further includes a means to supply pulses, negative-going pulses to be supplied to one integrator, and positive-going pulses to be supplied to the other integrator. When the pulses are removed, in response to an appropriate signal from the digital means, current flows from the capacitor of said one integrator to the capacitor of said other integrator. The arrangement is such that the current provides a positive-going voltage ramp applied to one deflection plate and a negative-going voltage ramp applied to the other deflection plate for the required sawtooth waveforms to be applied to the deflection plates. The current flowing between the two capacitors is arranged to flow through an input bipolar transistor and a resistor. The varying analogue output from the DAC causes a potential (in relation to a datum reference potentially usually comprising zero potential) to be applied to the base of the input transistor, so that the transistor causes corresponding variations of the sawtooth waveforms. These variations of the sawtooth waveforms avoid distortion of the raster scan pattern which would otherwise be obtained.

The present invention will now be described by way of example with reference to the accompanying drawings, in which:

FIG. 1 is a side elevation of the cathode ray tube (CRT) of a flat screen CRT display system, the side of the CRT envelope being omitted to show the screen, the electron gun assembly and the deflection plates of the CRT, there also being indicated electron beam paths impinging at spaced points along a raster line scan, of the raster scan pattern, provided by the CRT display system, FIG. 2 corresponds to FIG. 1, but is a plan view of the CRT, the front of the CRT envelope being omitted, to show the screen, the electron gun assembly and the deflection plates of the CRT, there also being indicated a distorted, truncated, flute shaped raster scan pattern provided on the CRT screen if linear-portion saw-tooth waveforms are applied to the deflection plates of the flat screen CRT display system, as would be so applied in a conventional CRT display system, FIG. 3 is a block diagram of an arrangement of digital means arranged to drive digital to analogue converters (DAC's), to generate the deflection signals to be applied to the deflection plates of the CRT of one embodiment of a flat screen CRT display system, to provide a raster scan pattern coincident with the CRT screen, and the raster scan pattern being at least substantially, free from the truncated, flute shaped distortion illustrated in FIG. 2.

Figure 5:
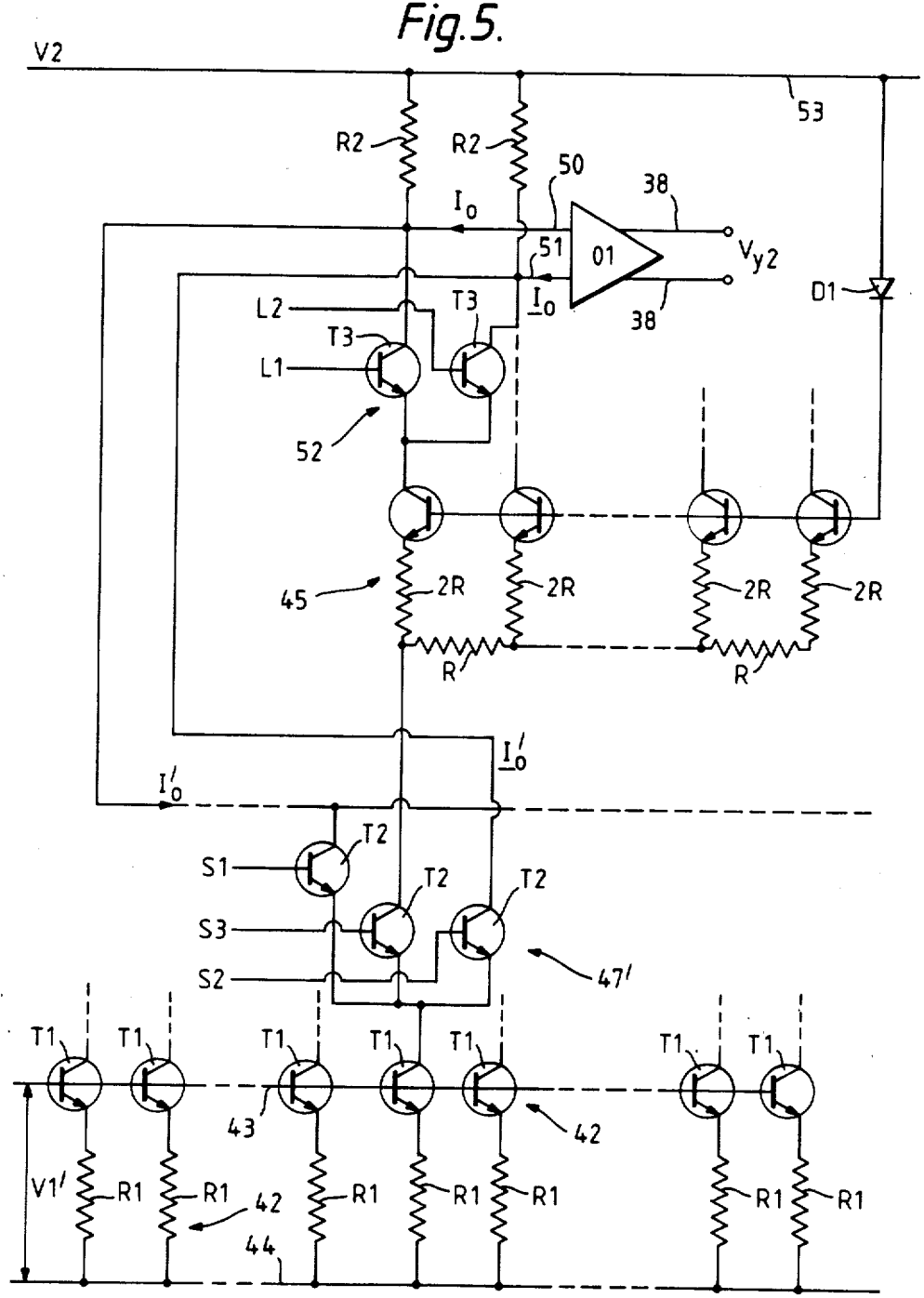
Figure 6:
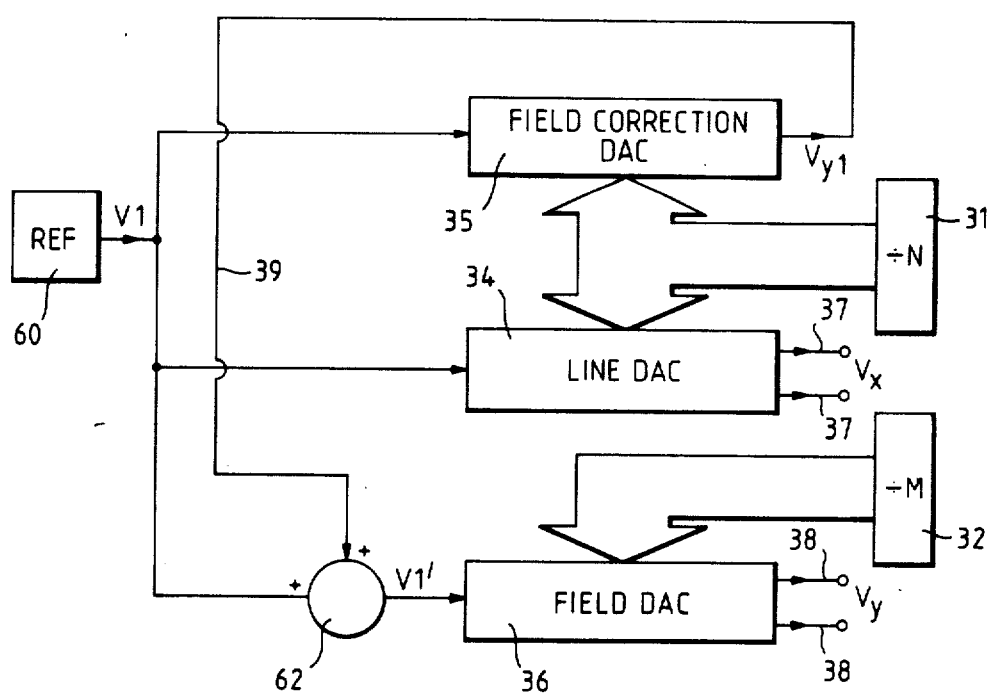
Figure 7:
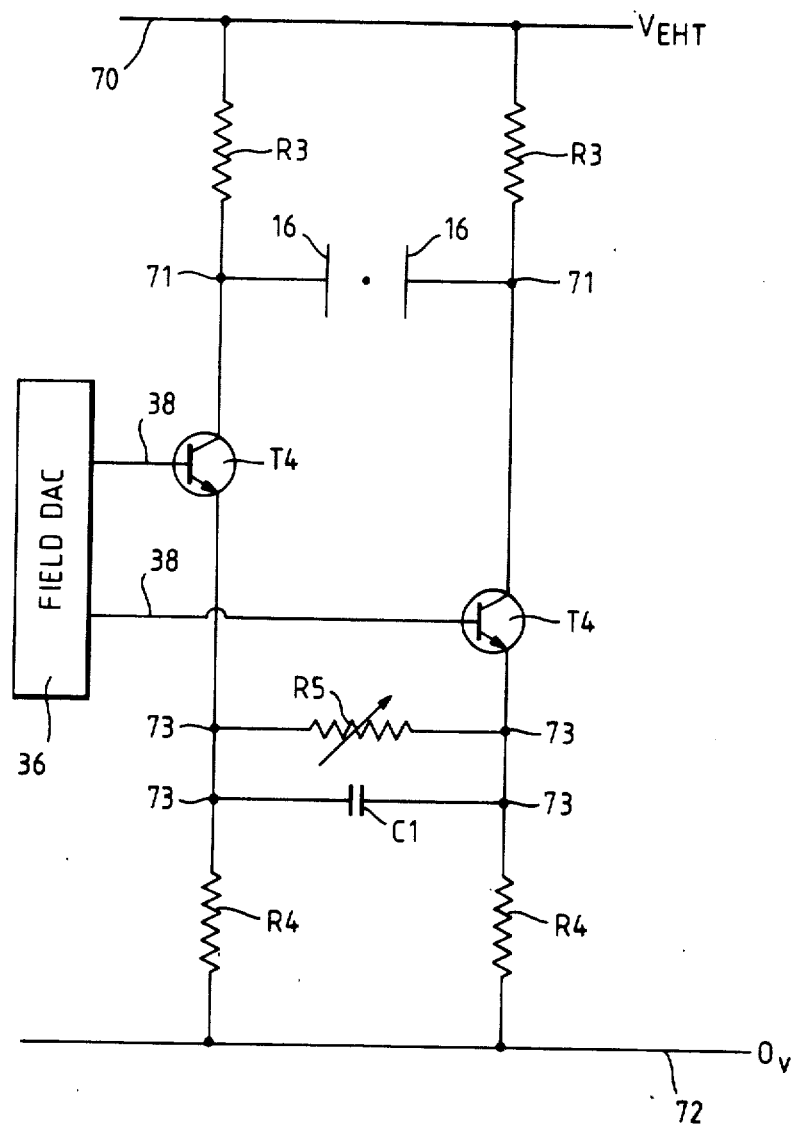
Figure 8:
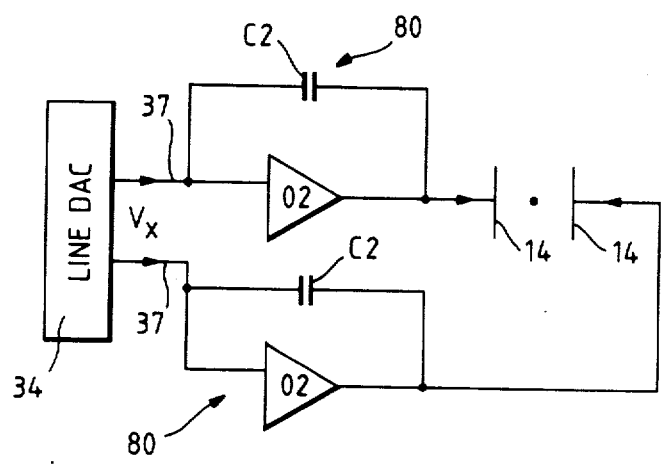
Figure 9:
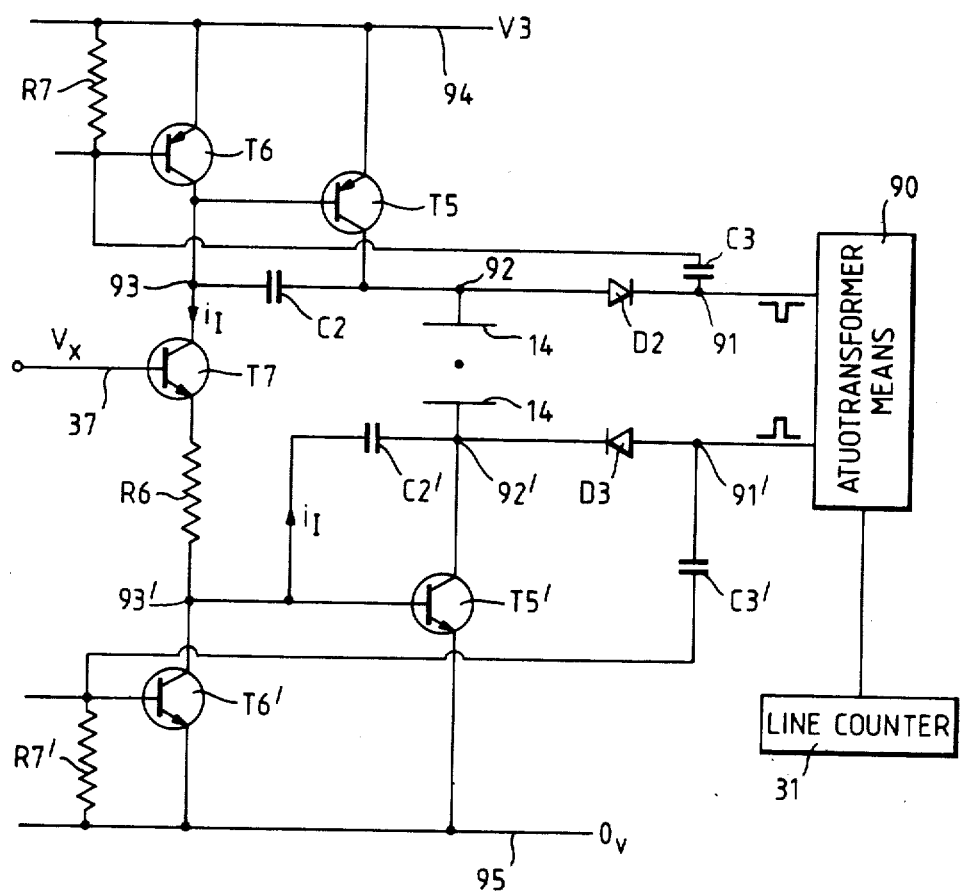

FIG. 4 shows, in schematic form, a so-called segmented DAC, arranged to operate upon digital input signals which are not differential in form, in contrast to each DAC of the arrangement of FIG. 3 being required to operate upon digital input signals which are differential in form, FIG. 5 corresponds to FIG. 4, but shows a modified form of the DAC capable of operating upon differential digital input signals, and, in response, to provide a stepped analogue output, also of differential form, FIG. 6 corresponds to FIG. 3, but is of the arrangement redrawn to illustrate the supply of reference voltages to current sources of the segmented DAC's, FIG. 7 is of the circuit whereby the differential analogue output from the appropriate DAC is applied to the Y deflection plates of the CRT, FIG. 8 is a block schematic diagram showing how the differential analogue output of one, Line, DAC, of the arrangement of FIG. 3, is applied to integration means, before the outputs of the integration means are applied to the X deflection plates of the CRT, and FIG. 9 is a circuit diagram, comprising one embodiment in accordance with the present invention, of how the analogue output of one, Line, DAC, of the arrangement of FIG. 3 is applied to conventional sawtooth waveforms to be applied to the X deflection plates of the CRT, and capable of causing raster line scans, the analogue DAC output modifying the waveforms to compensate for distortion, otherwise obtained.

The present invention relates to a cathode ray tube (CRT) display system, for example, having a flat screen CRT, any required display being provided on a rectangular shaped CRT screen by the electron beam scanning over the screen with a conventional raster scan pattern. Usually, the CRT is provided with electrostatic deflection plates. Such a CRT is described in British patent specification No. 1592571.

It is convenient to consider that, when the rectangular shaped CRT screen is viewed in plan, the X axis of the screen extends coincident with the longitudinal axis of symmetry of the screen, and the Y axis extends along the shorter axis of symmetry of the screen. Thus, when the appropriate potential differences, in the form of deflection signals, are applied across, what are considered to be, the X deflection plates of the flat screen CRT the electron beam is caused to scan along raster lines parallel to the X axis of the screen, and when the appropriate potential differences, or deflection signals, are supplied across, what are considered to be, the Y deflection plates there are caused the successive raster scan lines in a raster scan frame, the raster scan lines being spaced from each other along the Y axis of the screen, and at right angles thereto, in a known manner.

There is shown in FIG. 1 the side elevation of a flat screen CRT, the side of the CRT envelope being omitted to show the CRT screen 10, an associated electron gun assembly indicated generally at 12, and deflection plates 14 and 16, of a flat screen CRT display system to which the present invention relates. These components are shown in an envelope 18. Also shown in FIG. 1 are typical electron beam paths, from the electron gun assembly 12, between the X deflection plates 14, to impinge on the screen 10, at uniformly spaced points along a raster scan line. The potential differences between the X deflection plates 14 control the displacement of the electron beam parallel to the X axis of the screen. The electron gun assembly 12 extends parallel to the screen plane, in a plane only displaced by a small distance from the screen plane. The Y deflection plates are indicated at 16, and the potential differences therebetween control the displacement of the electron beam parallel to the Y axis of the screen.

FIG. 2 corresponds to FIG. 1, but is a plan view of the CRT, the front of the CRT envelope 18 being omitted to show the CRT screen 10 in plan. As can be seen in FIG. 2, the electron gun assembly 12, when so viewed, extends coincident with an extension of the X axis, indicafted at the left hand side (LHS) of the Figure, or the longitudinal axis of symmetry, of the CRT screen 10, the electron gun assembly being displaced laterally from the screen.

For a CRT display system not having a flat CRT screen construction, for example, as shown in FIGS. 1 and 2, it is conventional to provide the required raster scan pattern by applying deflection signals comprising linear-portion saw-tooth waveforms to the deflection plates, the desired saw-tooth waveforms being generated, possibly, solely by analogue means. Inherently with the construction of a flat screen CRT display system, as shown in FIGS. 1 and 2, if such linear-portion saw-tooth waveforms are applied to the deflection plates 14 and 16, a distorted raster scan pattern, having a truncated fluted shape, is provided in relation to the CRT screen, the longitudinal axis of symmetry of the flute shaped raster pattern being coincident with the X axis, or the longitudinal axis of symmetry, of the screen, as is desired. Such a truncated flute shaped raster scan pattern is shown in FIG. 2 superimposed upon the screen 10 of the illustrated flat screen CRT.

In respect of a flat CRT screen display system to which the present invention relates, the required deflection signals to be supplied to the deflection plates 14 and 16, in order to cause the electron beam to scan in the required raster scan pattern, coincident with, at least substantially, free from distortion, having the same size, and shape, as the rectangular shaped CRT screen, are generated by digital means including counters, and arranged to drive digital to analogue converters (DAC's).

In particular, it is convenient, as described below, if the digital means, and the DAC's to generate the required deflection signals to be supplied to the deflection plates 14 and 16, are arranged to operate upon digital differential signals. Each such digital differential signal has two constituent parts, on two leads, each constituent part comprising, individually, a voltage signal. Thus, there is a said one voltage signal of one sense, at one of two possible logic levels, and a said other voltage signal, at the other of the two possible logic levels, in relation to what is considered to be the associated logic threshold mid-way therebetween. Said other voltage signal is considered to be complementary to said one voltage signal, although the associated pair of signals may not be at the same potential, but of opposite sense. Said other voltage signal may be of the same sense as, but of a lower potential than, said one voltage signal, in relation to zero potential; or vice versa. The corresponding differential signal comprises the difference between the potentials of the associated pair of voltage signals. The logic threshold associated with the digital differential signal, if not zero potential, is considered to be the common mode voltage associated with the differential signal.

For each digital differential signal a logic "0" is provided by one constituent voltage signal of the differential signal being negative, and the other constituent voltage signal being positive, or said one voltage signal being more negative than said other constituent voltage signal, and a logic "1" is provided by said one voltage signal being positive, or more positive than said other voltage signal; or vice versa.

For convenience, hereinafter in this specification, and the accompanying claims, digital differential inputs and outputs of constituent portions of the flat screen CRT display system to which the present invention relates are referred to, each such digital differential input, or output, being considered as providing a series of discrete differential signals to be operated upon in the required manner within the display system. In relation to each such differential input there is a pulse repetition rate associated with possible changes in the logic levels, a constituent differential input signal, of the series of differential input signals, being considered as being provided, corresponding to each consecutive pulse from a clock pulse generator, or oscillator, at the pulse repetition rate associated therewith, the oscillator being included in the display system to control the operation of the associated portion of the system. In relation to each differential output from a constituent portion of the display system, there is considered to be provided a series of differential output signals, each such differential output signal being provided in response to a simultaneous differential input signal, or signals, to the portion, and operated upon therein. There are logic levels associated with digital differential outputs, and the differential output logic levels may not be the same as the differential input logic levels.

Similarly, it is known to provide differential digital signals to drive DAC's, and it is known that the stepped, analogue outputs from the DAC's, for example, driven by the digital means referred to above, are of such a differential form, although not having any logic levels associated therewith. The centre potential of each constituent analogue signal, or step, considered to be discrete, within such a stepped differential analogue output, and corresponding to a simultaneous discrete, differential, digital input signal, or signals, to the associated DAC, is considered to be the common mode potential of the differential analogue output signal. The magnitude associated with a differential analogue output signal is represented by the potential difference between the constituent parts of the differential analogue output signal.

The general scheme of such digital means, driving DAC's to cause the generation of the required raster scan pattern, is shown in FIG. 3.

An oscillator 30, of a known construction, provides pulses, at a constant pulse repetition rate O to a divide by N counter 31, which in turn provides pulses, at a rate O/N, to a divide by M counter 32. Each counter 31 or 32 comprises a ripple-through shift register, arranged to operate upon differential pulses, or signals, supplied thereto from the oscillator 30. Conveniently, it can be considered that in the required raster scan pattern each raster scan line has N pixel points, and that there are M raster scan lines in the pattern. Hence, if the desired display refresh rate is once per second, the required oscillator pulse repetition rate O is $N \times N$ Hertz. If the desired display refresh rate is a multiple D per second, the pulse repetition O of the oscillator is $D \times M \times N$ Hertz, and the counter 32 receives pulses at the rate $D \times M$ Hertz.

For each counter 31 and 32, when considered from the start of their operations, and in response to the receipt of each oscillator pulse, a corresponding multi-bit digital signal is proved in parallel form from the counter, a different digital signal being provided in response to the receipt by the counter of the different pulses. When the counter 31 has received N pulses from the oscillator 30, or when the counter 32 has received M pulses from the counter 31, the counter resets, and in the case of the counter 31, provides a pulse to the counter 32. Thus, there is an operating cycle associated with each counter 31 or 32, the period of each repetitive operating cycle for the counter 31 being at least equal to a required raster line scan period (t), and the period of each repetitive operating cycle for the counter 32 being at least equal to a required raster frame scan period (T). Further, successive oscillator pulses received by the counter 31 correspond to successive pixels in the raster scan lines, so that in each repetitive operating cycle of the counter, the successive N differential digital signals therefrom, as N oscillator pulses are supplied successively to the counter, represent the successive pixels on a raster scan line, and, in particular are capable of representing the successive pixel positions in the raster scan line. Similarly, for an undistorted raster scan pattern, successive pulses received by the counter 32 correspond to successive raster lines in the raster frames, so that in each repetitive operating cycle of the counter, the successive M differential digital signals therefrom, as M pulses are supplied successively to the counter, represent the successive raster scan lines in a raster frame, and, in particular, are capable of representing the successive raster line positions in the raster frame.

Each series of differential digital signals from the counter 31, in an operating cycle of the counter, is supplied to a DAC 34 arranged to provide, in response, an appropriately stepped, differential, analogue current output, to cause the provision of corresponding deflection signals to be supplied to the X deflection plates 14 in a raster line scan period (t), to cause the straight raster line scan, of an undistorted raster scan pattern, to be produced. As stated above, successive differential digital DAC input signals represent successive pixel positions along the raster scan line, the pixel positions being required to be uniformly spaced along the raster line, and hence parallel to the X axis, or the longitudinal axis of symmetry of the CRT screen 10. Similarly, each series of differential digital signals from the counter 32, in an operating cycle of the counter, is supplied to a DAC 36 arranged to provide, in response, an apropriately stepped, differential analogue current output, to cause the provision of corresponding deflection signals to be supplied to the Y deflection plates 16 in a raster frame scan period (T), for an undistorted raster scan pattern. As stated above, successive differential digital DAC input signals represent successive straight raster scan line positions within the raster frame, the raster line positions being required to be uniformly spaced along the Y axis, or the shorter axis of symmetry of the CRT screen 10.

It is convenient to refer to the counter 31 as the Line counter, associated with the X axis of the required raster scan pattern, and to refer to the counter 32 as the Field counter, associated with the Y axis of the required raster scan pattern.

If there are to be between 64 and 128 pixel positions is each raster scan line, the binary number N, associated with the Line counter 31 is required to be 128, the Line counter 31 provided being a seven-bit counter. Similarly, if there are to be between 256 and 512 raster scan lines in each raster scan frame, the binary number M, associated with the Field counter 32 is required to be 512, the Field counter 32 provided being a nine-bit counter.

In response to each pulse from the oscillator 30, a corresponding, parallel, seven-bit digital signal, of differential form, is provided from the Line counter 31, both to the DAC 34, designated the Line DAC, and to a DAC 35, designated the Field Correction DAC. Each differential digital signal from the Line counter 31 is representative of the number of pulses instantaneously stored in the Line counter. Similarly, in response to each pulse received by the Field counter 32, a corresponding, parallel, nine-bit digital signal, of differential form, is provided from the Field counter 32 to the DAC 36, designated the Field DAC, and each such differential digital signal is representative of the number of pulses instantaneously stored in the Field counter 32.

The corresponding, differential, appropriately stepped analogue current output from the Line DAC 34 is shown as being provided on two leads 37, and is to cause the corresponding appropriate voltage deflection signals, to be applied to the X deflection plates 14, the leads 37 being connected individually to the X deflection plates 14. Similarly, the corresponding, differential, appropriately stepped analogue current output from the Field DAC 36 is shown as being provided on two leads 38, to cause the corresponding appropriate voltage deflection signals, to be applied to the Y deflection plates 16, the leads 38 being connected individually to the Y deflection plates 16.

For convenience, and as indicated at the LHS of FIG. 2, the centre of the LHS of the CRT screen 10 is considered to be the origin of both the X and Y axes associated with the screen, the positive and negative portions of the axes extending in their usual directions.

When the electron beam is required to impinge to the centre raster line of the raster scan pattern, coincident with the X axis, and with the associated Y axis value being zero, the common mode voltage of the differential analogue signal applied to the Y deflection plates 16 is required to have an appropriate high positive value. The difference between the potentials of the Y deflection plates 16 is zero. Differences between the potentials of the Y deflection plates 16 cause corresponding deflections of the impingement point of the electron beam on the CRT screen parallel to the Y axis. The electron beam being negatively charged, requires the potential differences associated with the differential analogue signals to be applied to the Y deflection plates 16 to be such that the upper Y deflection plates, as shown in FIG. 2, is at a greater positive position than the positive potential of the lower Y deflection plate, for the electron beam to impinge upon a raster line in the upper part of the CRT screen 10, with the associated Y axis value being positive. Consequently, because the upper part of the CRT screen 10 corresponds to the positive going part of the Y axis, such a potential difference is referred to as being positive, and the corresponding differential analogue signal to be applied to the Y deflection plate is referred to as being positive. Similarly, when the electron beam is required to impinge upon a raster line in the lower part of the CRT screen 10, with the associated Y axis value being negative, the upper deflection plate is required to be at a smaller positive potential than the positive potential of the lower Y deflection plate. The corresponding potential difference is referred to as being negative, and the corresponding differential analogue signal to be applied to the Y deflection plates is referred to as being negative.

However, when the electron beam is required to impinge on the Y axis of the CRT screen, with the associated X axis value being zero, as is apparent from FIG. 1, the corresponding common mode potential of the differential, analogue signal applied to the X deflection plates 14 is required to have an appropriate high positive value, but the potential of the lower X deflection plate, as shown in FIG. 1, is more positive than the potential of the upper X deflection plate. For convenience, this potential difference is considered to be zero, corresponding to the X axis value being zero. Further, for the electron beam to impinge upon the CRT screen 10, with the associated X axis value being positive, the potential of the lower X deflection plate is required to be even more positive, in relation to the potential of the upper X deflection plate, than when the electron beam impinges on the Y axis, and, in this case, the potential difference is referred to as being positive, and the corresponding differential analogue signal to be applied to the X deflection plates is referred to as being positive. Similarly, if the potential of the lower X deflection plate is required to be less positive, in relation to the potential of the upper X deflection plate, than when the electron beam impinges on the Y axis, and, in this case, the potential difference is referred to as being negative, and the corresponding differential analogue signal to be applied to the X deflection plates is referred to as being negative.

Ignoring, initially, the Field Correction DAC 35, and assuming, initially, that both the Line DAC 34 and the Field DAC 36 operate in accordance with appropriate linear functions, if the differential, linearly varying analogue output from the Line DAC causes corresponding deflection signals to be applied to the X deflection plates of a conventional CRT display system, not having a flat CRT screen type of construction, and the differential, linearly varying analogue output from the Field DAC causes corresponding deflection signals to be applied to the Y deflection plates, of such a conventional CRT display system, without any distortion of the raster pattern associated therewith, it can be arranged that the required rectangular shaped raster scan pattern is provided thereby. However, if such a differential, linearly varying analogue output from the Line DAC 34, and from the Field DAC 36, cause corresponding deflection signals to be supplied, respectively, to the X deflection plates 14, and to the Y deflection plates 16, of a flat screen CRT display system, as described above, the truncated, flute shaped raster scan pattern, shown in FIG. 2, is produced thereby.

In order to modify the truncated, flute shaped raster scan pattern, capable of being produced by the arrangement of FIG. 3 in the manner described above, within this arrangement the Field Correction DAC 35 is provided, and the Field Correction DAC is to operate in accordance with a desired non-linear function, uniformly for each raster scan line, in response to the series of differential digital signals from the Line counter 31. As described in greater detail below, the Line DAC 34 is also required to operate in accordance with a non-linear function, but initially it can be considered to be a DAC operating in accordance with a linear function. The Field DAC 36 is required to operate in accordance with an appropriate linear function, also as described in greater detail below, and in response to the series of differential digital signals from the Field counter 32. A required interaction between the non-linear output of the Field Correction DAC 35 and the manner of operation of the Field DAC 36 is indicated, generally, by a lead 39 therebetween, shown in FIG. 3. The combined manner of operation of the interacting Field Correction DAC 35 and the Field DAC 36 represent a function, representing corresponding variations of the non-linear differential, analogue Field DAC output required, to cause there to be applied to the Y deflection plates 16, appropriate differential deflection signals to correct the distorted, flute shaped raster scan pattern, otherwise produced, in relation to the X axis of the CRT screen 10.

Because, as indicated above, the differential, appropriately stepped analogue current outputs from the Line DAC 34 and the Field DAC 36 are to cause corresponding appropriate voltage deflection signals to be applied, respectively, to the X deflection plates 14, and the Y deflection plates 16, it is convenient to consider subsequently in this specification that the Line DAC and the Field DAC supply the required voltage deflection signals direct to, respectively, the X deflection plates, and the Y deflection plates. The required, differential voltage deflection signals $V_x$ are indicated as being supplied on the two leads 37 from the Line DAC 34; and the required, differential voltage deflection signals $V_y$ are indicated as being supplied on the two leads 38 from the Field DAC 36.

Each of the DAC's 34, 35 and 36, conveniently, has the so-called segmented DAC type of construction. Whilst this form of construction is optional in the case of a DAC operating in accordance with a linear function, such as the Field DAC 36, it is desirable that each DAC operating in accordance with a desired non-linear function, such as the Field Correction DAC 35, has the segmented DAC form of construction, because this form of construction, described in detail below, is suitable to be adapted readily to operate in accordance with a desired non-linear function.

Shown in FIG. 4 of the accompanying drawings is a known form of seven-bit, segmented DAC, initially considered to be linear in operation, and initially considered to be arranged to operate on input signals which are not differential in form, and, in response, to produce a corresponding stepped analogue output which is not differential in form. A set of four most significant bits (MSB's) of each digital signal to the converter, from say the Line counter 31, is provided to a switching matrix, indicated generally within a dotted line 40. Each set of four MSB's is representative of a digital value comprising a multiple (p) of a predetermined binary number (q), (p) having any integral value, including zero, and upto a maximum possible value of (N'−1), N' being equal to sixteen, and (q) being eight. N' substantially identical current sources, each indicated generally at 42, and comprising an NPN transistor T1 and a resistor R1, are connected to the switching matrix 40. The current sources 42 each have an output (i), shown as entering each source, and considered as representing the predetermined binary number (q).

The (N') sources 42 are connected in parallel to the switching matrix 40. The bases of the transistors T1 are connected to a common rail 43, the collectors are connected to the switching matrix 40, and each of the emitters is connected individually to one end of the associated resistor R1. The other end of each resistor R1 is connected to a common rail 44. The current (i) flows in the collector circuit of each transistor T1.

In response on the receipt by the switching matrix 40 of a set of MSB's, the corresponding number (p) sources 42 are connected to the converter output solely via the switching matrix, and at the converter output there is provided a summed current $I_o'$, which is zero when (p) is zero, and comprises at least part of the corresponding analogue output signal from the converter. A first, or a further, source 42 is connected to the converter output via both the switching matrix and a subdivision system, indicated generally at 45. The subdivision system 45 comprises a known, non-segmented, form of digital to analogue converter (DAC), and usually includes an R-2R network of resistors. The sets of three least significant bits (LSB's) of the digital input signals to the converter, from the Line counter 31, are provided to the subdivision system 45. In response to each set of LBS's the magnitude of the current (i), supplied by the aforesaid source connected thereto, is reduced at the output of the subdivision system, to provide an analogue signal representing the digital value represented by the set of LSB's. The magnitude represented by the analogue signal provided at the output of the subdivision system 45 can have any integral value, including zero, and upto, but not including, the predetermined binary number (q), and instead of representing the predetermined binary number (q). At the converter output, the output of the subdivision system 45 is combined with the summation $I_o'$ of any source outputs supplied thereto solely via the switching matrix 40, so that the analogue output signal $I_o$ from the converter represents the value represented by the whole of the instantaneous digital input signal to the converter.

In the case when the DAC is not arranged to operate upon differential signals, as illustrated in FIG. 4, when a source 42 is not connected to either the converter output, or the subdivision system, the current therefrom is supplied to a sump, not shown, comprising a low impedance load.

If the operation of the segmented converter, and in particular the connection of the sources to the subdivision system 45, is considered, in response to the receipt of the sets of MSB's supplied to the switching matrix 40, there is an order position for each source 42 within the sequence in which the sources are connected to the subdivision system, as the values represented by digital input signals to the converter increase continuously from zero. The sources in the lower order positions in the sequence to that of the source instantaneously connected to the subdivision system 45, simultaneously, are connected to the converter output solely via the switching matrix. It is convenient to consider that each of the sources individually, and respectively, within the sequence, represent (p) being zero, and, incrementally, each integral value from unity up to (N'−1), corresponding to the connection of the sources solely to the converter output.

Also for convenience, the switching matrix 40 is considered as including N' bipolar, or three-way, switches 47, of any convenient form. For a DAC arranged to operate upon differential signals three way switches 47 are required. The collectors of the transistors T1 of the current sources 42 are connected individually to an associated predetermined one of the bipolar switches 47. In the sequence referred to in the preceding paragraph, the bipolar switches have order positions which correspond individually to the order positions of the sources 42 connected thereto.

The bipolar switches 47 are shown as being actuated by signals from decoding means, of the switching matrix 40, and indicated generally at 48, the decoding means having N' outputs, each output being connected individually to a bipolar switch. Each output of the decoding means can be considered as corresponding to the set of MSB's which causes there to be provided at the output a signal of a first of two possible forms, to close in the first of two possible ways, individually, the associated bipolar switch, to cause the associated source to be connected to the subdivision system. Consequently, there is a sequence of sets of MSB's corresponding to the sequence of sources, and to the sequence of bipolar switches. The order positions of the sets of MSB's within the sequence correspond individually, and respectively, to the order positions of the sources in the corresponding sequence. These sets of MSB's within the sequence represent, respectively, (p) being zero, and, incrementally, each integral value from unity upto (N' − 1). However, when considering each of the sources individually, and respectively, within the sequence with (p) being, in turn, zero, and, incrementally, each integral value from unity upto (N' −), as referred to above, each of the sources of lower order than the source instantaneously connected to the subdivision system, simultaneously are connected to the converter input solely via the switching matrix. This is in response to the receipt, from corresponding outputs of the decoding means, of signals of the second of the two possible forms, to close the corresponding bipolar switches in the second of the two possible ways.

When the bipolar switches are open, the current outputs of the associated sources are supplied to the sump.

There is shown the ninth bipolar switch 47' closed in the first way, to connect the associated source to the subdivision system 45, in response to the receipt by the decoding means of the appropriate set of MSB's. The sources having the lower order positions in the sequence referred to above, simultaneously, are connected to the converter output solely via the switching matrix. In particular, they are connected to the converter output by the associated bipolar switches being closed in the second of the two possible ways, in response to signals of the second of the two possible forms, respectively, on the associated outputs of the decoding means, preceding the output connected to the bipolar switch 47', closed in the first of the two possible ways, in the predetermined sequence of outputs. Such output signals of the second form are provided by logic means within the decoding means, automatically in response to the receipt by the decoding means of the instantaneous set of MSB's causing the output connected to the bipolar switch closed in the first of the two possible ways.

Thus, there is associated individually with each set of MSB's a corresponding analogue output signal value $I_o'$, of the plurality of different possible analogue output signal values, represented by the different multiples (p) of the output current (i) of each source 42. Further, there is associated with each digital signal considered as a whole, and from the counter 31, a corresponding analogue output signal value $I_o$, represented by the summation of the appropriate multiple (p) of the output current (i) of each source 42, and the current representative of the binary number (q), represented by the set of LSB's instantaneously supplied to the subdivision system 45.

For a segmented DAC, such as the one described above, to operate in accordance with a predetermined non-linear function, conveniently, the resistors R1 in the current sources 42 are not identical, but have different predetermined magnitudes, the relationship between successive resistors R1 of the series being in accordance with the predetermined non-linear function.

If the first constituent raster line scan of the distorted, flute shaped raster scan pattern, described above, is considered, with the start of the raster line being coincident with the top left hand corner of the CRT screen 10, the potential differences of the differential analogue signals $V_y$ applied to the Y deflection plates 16 are required to increase throughout the first raster line scan period (t) in a predetermined non-linear way, to be represented by the desired non-linear function associated with the segmented Field Correction DAC 35. The predetermined non-linear way in which the potential differences $V_y$ applied to the Y deflection plates vary are to cause the first raster line scan to be parallel to the X axis of the CRT screen 10, instead of being curved. Thus, the desired non-linear function in accordance with which the Field Correction DAC 35 is required to operate over the first raster line scan period (t) is the inverse of the non-linear function representing the curved, uncorrected first raster line scan in relation to the X axis of the CRT screen 10. Now assume that the potential differences $V_y$ applied to the Y deflection plates cause the corrected, straight, first raster line to have its required location at the top of the CRT screen 10. Then the potential differences $V_y$, varying non-linearly over the raster line scan period (t) in the same way as for the first raster line, in relation to each raster line considered as a whole, and to cause each of the other raster lines to have their required locations along the Y axis of the CRT screen, are required to differ from each other by a variable, stepped, scaling factor, over the raster frame scan period (T), each constituent step having the duration of a raster line scan period (t). Thus, conveniently, the variable scaling factor is represented by the appropriate linear function, referred to above, in accordance with which the Field DAC 36 is required to operate over the raster frame scan period (T), the Field counter 32, driving the Field DAC, being, in turn, driven by pulses from the Line counter 31, one such pulse being provided in each raster line scan period (t).

Required compensating increases in the potential differences of the differential analogue signals $V_y$ applied to the Y deflection plates 16 are to increase the deflection of the electron beam parallel to the Y axis of the screen in the positive sense when the electron beam is displaced parallel to the Y axis in the positive sense, and are to increase the deflection of the electron beam parallel to the Y axis of the screen in the negative sense when the electron beam is displaced parallel to the Y axis in the negative sense. For the raster scan line period (t) at exactly half-way through the raster frame scan period (T), when the corresponding raster scan line is coincident with the X axis of the screen, both in the desired rectangular raster scan pattern, and in the distorted, flute shaped raster scan pattern, no correcting increase of the deflection of the electron beam parallel to the Y axis, and of either sense, is required.

The appropriate combination of the predetermined non-linear function, uniform for each raster line scan period (t), in relation to the potential differences $V_y$ of the differential analogue signals required to be applied to the Y deflection plates 16, and the appropriate linear function representing variations of the potential differences $V_y$ of the differential analogue signals required to be applied to the Y deflection plates 16 over a raster frame scan period (T), comprises a function which is the inverse of the function capable of representing the distorted, flute shaped raster scan pattern in relation to the X axis of the screen, and is representative of the compensating potential differences $V_y$ of differential analogue signals required to be applied to the Y deflection plates in order to correct the flute shaped distortion, and to obtain the desired rectangular raster scan pattern.

Initially ignoring the variable scaling factor, the potential differences $V_y$ of differential signals applied to the Y deflection plates 16 are to increase in the predetermined non-linear way, to be represented by the desired non-linear function associated with the manner of operation of the Field Correction DAC 35, uniformly for each constituent raster line scan period (t) of the raster pattern, and the Field Correction DAC is required to be driven by differential digital signals from the Line counter 31. As indicated in FIG. 3, the non-linear variation of the differential analogue signals $V_{y1}$ from the Field Correction DAC, over each raster line scan period (t), and representative of corresponding non-linear variations in the potential differences $V_y$ of differential analogue signals to be applied to the Y deflection plates 16, can be represented by a graph, the shape of which graph is the inverse of the shape of the first raster line otherwise obtained in relation to the X axis of the CRT screen 10. Thus, the differential signals $V_{y1}$ vary, in the predetermined non-linear way, from representing zero to a maximum positive value over the raster line scan period (t).

The Field Correction DAC 35 operates in accordance with the predetermined non-linear function by the successive resistors R1 in the current sources 42 having different predetermined magnitudes, the relationship between successive resistors of the series being in accordance with the predetermined non-linear function, and the desired resistances may be determined in an empirical manner. The Field Correction DAC 35 is a seven-bit DAC, driven by digital signals from the seven-bit line counter 31, there being between 64 and 128 constituent pixels in each raster scan line. Conveniently, the segmented Field Correction DAC 35 has sixteen constituent segments, or current sources 42, so that there are sixteen groups of constituent steps in the stepped analogue output from the Field Correction DAC, within each group of steps there being eight uniform steps, there being non-uniform variations only between each group of steps, each group being considered as a whole. The arrangement adequately represents the required non-linear function.

The constituent function, of the combined function referred to above, the constituent function representing variations of the potential differences $V_y$ required to be applied to the Y deflection plates 16 over a raster frame scan period (T), and comprising the appropriate stepped linear function, conveniently, to be represented by the required manner of operation of the Field DAC 36, requires the Field DAC to be driven by differential digital signals from the Field counter 32.

In particular, as indicated in FIG. 3, it is required that the appropriate linear function in accordance with which the Field DAC 36 is required to operate, when considered alone, is such that the compensating potential differences $V_{y2}$, of differential analogue signals from the Field DAC, over any raster frame scan period (T), causes, when supplied to the Y deflection plates 16, an electron beam deflection which is zero half way through the raster frame scan period (T). The electron beam deflection decreases linearly in the first half of the raster frame scan period, from a maximum positive value for the first raster line scan, and increases linearly in a negative sense in the second half of the raster frame scan period, having a maximum negative value for the final raster line scan, equal in magnitude to the maximum positive value for the first raster line scan. Thus, the shape of the graph of the potential differences $V_{y2}$ over the raster frame period (T) is a straight line having a predetermined negative slope, and comprises a representation of the appropriate linear function in accordance with which the Field DAC 36 is required to operate, and of the variable scaling factor referred to above.

The variable scaling factor, or the appropriate linear function, to be introduced by the Field DAC 36, is inherently introduced by the successive equal resistors R1 in the current sources 42 of the Field DAC 36. The Field DAC 36 is, at least, a nine-bit DAC, driven by digital signals from the nine-bit Field counter 32, there being between 256 and 512 constituent raster lines in each raster frame. Conveniently, the segmented Field DAC 36 has sixteen constituent segments, or current sources 42, each corresponding to a small multiple of the constituent raster lines in the raster scan pattern. Each of the 512 constituent steps of the stepped differential analogue output from the Field DAC 36 is uniform, as is required.

FIG. 5 corresponds to FIG. 4 but shows the arrangement of a nine-bit, segmented DAC in greater detail. In particular, the DAC shown in FIG. 5 is the Field DAC 36, and unlike the DAC shown in FIG. 4, is shown in a form suitable to receive digital differential signals from the Field counter 32, and, in response, to provide a corresponding stepped analogue output which is differential in form.

Each three-way switch 47 comprises three bipolar transistors T2, with their emitters connected to the associated current source 42. The bases of the transistors T2 are connected to the decoder 48 (not shown in FIG. 5), to receive signals therefrom. In FIG. 5, one discrete part of such a decoder output is designated S1, another part S2, and the third part S3, a signal from each such part being capable of being supplied, individually, to one of the three transistors T2. There are three such constituent parts S1, S2 and S3 for each decoder output, connected individually to the sixteen switches 47. The collector of each transistor T2 associated with a decoder output part S1 is connected to one input 50 of a differential amplifier 01; and the collector of each transistor T2 associated with a decoder output part S2 is connected to the other input 51 of the differential amplifier. The collector of each transistor T2 associated with a decoder output part S3 is connected to one end of the five-bit R-2R ladder network 45 of the subdivision means 45. Each of the thirty-two stages of the R-2R ladder network is connected, individually, to a two way switch 52, and comprising two bipolar transistors T3, with their emitters connected to the associated stage of the ladder network. The bases of the transistors T3 are connected, individually, to output parts L1 and L2, from each of the LSB stages of the Field counter 32, to receive signals therefrom. The collector of each transistor T3 associated with a counter output part L1 is connected to the same input 50 of the differential amplifier amplifier 01 as each transistor T2 associated with a counter output part S1. The collector of each transistor T3 associated with a counter output part L2 is connected to the same input 51 of the differential amplifier 01 as each transistor T2 associated with a decoder output part S2. There are two such constituent parts L1 and L2 for each of the LSB stages of the Field counter 32. Two signals are received simultaneously by each switch 52 from each associated pair of counter output parts L1 and L2, and together comprise a digital differential signal from the corresponding LSB counter stage. The end of the ladder network 45 remote from the connection to the transistor T2 associated with the decoder output part S3, is connected to a rail 50 maintained at a supply potential V2, via a diode D1. The two inputs of the differential amplifier 01 are also connected to the rail 53, by resistor R2. The two outputs of the differential amplifier 01 comprise the leads 38, on which are provided the two parts of the differential signals $V_{y2}$, from the Field DAC 36, and comprising a factor of the differential $V_y$ to be applied to the Y deflection plates 16.

In operation, if the ninth switch 47' is considered, and connects the associated current source 42 to the subdivision system 45, as in the arrangement of FIG. 4, a signal is provided from the associated output part S3 of the decoder 48, and the appropriate transistor T2 is rendered conducting. Instantaneously, appropriate LSB stages from the Field counter 32 each provides a signal from the corresponding counter output parts L1, to the corresponding switches 49, and, in particular, the appropriate transistors T3 connected to said one input 50 of the differential amplifier 01 are rendered conducting, by the signals, from the associated counter output parts L1, being supplied to the bases thereof.

All the decoder output parts S1 of decoder outputs of lower order in the sequence of such decoder outputs than the ninth, each supply a signal to the transistor T2 connected thereto, to render these transistors T2 conducting, and a current $I_o'$ flows into these current sources. Because of the appropriate transistors T3 of the switches 52 also being rendered conducting, by signals from counter output parts L1, current also flows through the subdivision means 45 to the ninth current source, the total current flowing from said one input 50 of the differential amplifier 01 being $I_o$.

Simultaneously, all the decoder output parts S2 of decoder outputs of higher order in the sequence of such decoder outputs than the ninth, each supply a signal to the transistor T2 connected thereto, to render these transistors T2 conducting, and a current $\underline{I}_o'$ flows into these current sources. Two signals are received simultaneously by each switch 47, except the switch 47' receiving a signal from a decoder output part S3, from the associated pair of decoder output parts S1 and S2, and together comprise a digital differential signal therefrom. The transistors T3 of the remaining switches 52, not receiving signals from the counter output parts L1, are also rendered conducting, by signals from counter output parts L2, and a current also flows through the subdivision means 45 to the ninth current source. The total current flowing from said other input 51 of the differential amplifier 01 is $\underline{I}_o$.

It will be appreciated that $I_o + \underline{I}_o$ is equal to the instantaneous total current flowing through the DAC, but is not a constant.

The arrangement is such that the differential output $V_{y2}$ from the differential amplifier 01 is proportional to the instantaneous value for $(I_o - \underline{I}_o)$. At the start of each operating cycle of the Field counter 32, $I_o$ has its maximum value, and $\underline{I}_o$ is zero. Hence, the differential output $V_{y2}$ has its maximum positive value, as required. The value for $V_{y2}$ then falls steadily, until, half way through the operating cycle; at a time $(T)/2$, $I_o = \underline{I}_o$, and the value for $V_{y2}$ is zero, as required. Then $\underline{I}_o$ becomes greater than $I_o$, and the differential output $V_{y2}$ goes negative. The negative value of $V_{y2}$ rises steadily through the second half of the operating cycle of the Field counter 32, until, at the end of the operating cycle, at a time (T), $I_o$ is zero, and $\underline{I}_o$ has its maximum value, equal to the maximum value of $I_o$ at the start of the operating cycle. At this time (T) the differential output $V_{y2}$ has its maximum negative value, equal in magnitude to its maximum positive value, as required.

In addition to the magnitudes associated with the analogue output of such a linear, or non-linear segmented DAC varying in accordance with the values represented by differential digital input signals thereto, the analogue output magnitudes also vary in accordance with changes in the reference voltage V1, shown in FIGS. 4 and 5, applied between the rails 43 and 44 connected, respectively, to the bases of the transistors T1 of the constant current sources 42, and the ends remote from the transistors T1 of the resistors R1 of the current sources, of the DAC.

The required interaction of the differential analogue output of the non-linear Field Correction DAC 35 with the operation of the linear Field DAC 36, in the appropriate manner, is obtained by arranging that the reference voltage V1', applied between the rails 43 and 44 of the Field DAC, varies with the non-linear analogue output of the Field Correction DAC, as indicated by the provision of the lead 39 in FIG. 3. In particular, the differential analogue output $V_{y1}$ of the Field Correction DAC 35 is provided on two leads, but, for convenience, only one such lead 39 is shown in FIG. 3. One lead is connected to the rail 43 of the DAC, and the other lead is connected to the rail 44 of the DAC. However, as stated above, in representing the required factor of the differential analogue signal $V_y$ to be applied direct to the deflection plates, the corresponding differential output $V_{y1}$ from the Field Correction DAC is required to vary in a non-linear way only between representing zero, and a maximum positive value. Hence, it is convenient to arrange that the potential supplied to the rail 44, connected to the resistors R1 of the current sources of the Field DAC 36, and comprising one constituent part of the differential output, is always zero, and only the potential on the rail 43, connected to the bases of the NPN transistors T1 of the current sources of the Field DAC, and comprising the other constituent part of the differential output, varies, only between zero, and a maximum positive value. Thus, the gain of the Field DAC 36 is caused to vary in accordance with the non-linear differential output of the Field Correction DAC 35. Hence, the analogue output of the linear Field DAC is not linear, and is in accordance with the combined function, representing non-linear variations of the compensating potential differences $V_y$ required to be applied across the Y deflection plates 16 in order to correct the distorted, flute shaped raster scan pattern, otherwise obtained.

In particular, and again initially ignoring the variable scaling factor, $V_{y2}$, associated with the Field DAC 36, it is required that at any instant within the first raster line scane period (t), considered individually, within a raster frame scan period (T), the varying reference voltage V1' applied between the rails 43 and 44 of the Field DAC 36, as the variable gain thereof, is given by the expression:

$$V1' = V1 + V_{y1}$$

where V1 is the constant output voltage of a reference source. The instantaneous voltage V1' applied between the rails 43 and 44 of the Field DAC are those required to provide the required straight raster scan line parallel to the X axis of the CRT screen. At the start of the raster line scan period V1' has the value of V1. At the end of the raster line scan period, V1' has its maximum possible value, and the instantaneous reference voltage V1' applied between the rails 43 and 44 of the Field DAC, at any instant in the raster line scan period (t), and comprising the variable gain of the Field DAC, as is required, is arranged to compensate for the curved raster line, otherwise obtained.

At the output of the Field DAC 36 the above expression is modified to include the variable scaling factor, $V_{y2}$, in the following manner:

$$Y_y = V_{y2}(V1 + V_{y1})k$$

where $V_{y2}$ is represented by the appropriate linear function in accordance with which the Field DAC operates over the raster frame scan period (T), varying between a maximum positive value, and an equal negative value; and k is a constant, equal to the reciprocal of the maximum value for $V_{y2}$. Thus, each constituent raster line of the raster scan pattern is straight in form, and each has its required location along the Y axis of the CRT screen 10. Hence, the different constituent portions, or steps, of the stepped analogue output $V_y$ from the Field DAC, the portions being considered as being discrete, are capable of causing, individually, each constituent raster line of a raster pattern.

The variations of the differential output $V_{y1}$ from the Field Correction DAC 35, and applied between the rails 43 and 44 of the current sources 42 of the Field DAC, do not adversely affect the manner of operation of the Field DAC, by causing corresponding, and undesired, variations in the currents $I_o$ and $\bar{I}_o$ flowing in relation to the differential amplifier 01, and only cause the desired variations in the gain of the Field DAC. This is because the Field DAC is arranged to operate upon digital differential signals, and, in response, to provide a differential, analogue output.

Alternatively, the arrangement of FIG. 3 may be such that the first raster line scan, of the distorted flute shaped raster scan pattern, intersects the top right hand corner of the CRT screen 10, instead of the top left hand corner of the screen as shown in FIG. 2. Consequently, the function representative of the non-linear output of the Field correction DAC 35, at the start of each operating cycle of the Line counter 31, has a maximum positive value, and falls steadily to zero, at the end of the Line counter operating cycle. The function representative of the linear output of the Field DAC 36 is required to have a positive slope, having a maximum negative value at the start of each operating cycle of the Field counter 32, and a maximum positive value at the end of the operating cycle, and zero value midway therebetween.

FIG. 6 corresponds to FIG. 3, except that the oscillator 30, and the connection between the Line counter 31 and the Field Divider 32, are omitted for the sake of clarity. Further, the arrangement has been redrawn to show how the constant reference voltage V1 is applied to each of the DAC's 34, 35 and 36, and in particular how the reference voltage V1' to the Field DAC 36 is caused to vary in the required manner in response to the non-linear analogue output $V_{y1}$ of the Field Correction DAC 35, in order to provide the required interaction between these two DAC's, indicated generally by the provision of the lead 39 in FIGS. 3 and 6. For convenience, the reference voltages to the DAC's 34, 35 and 36 are not shown as being differential in form, but each such reference voltage is of differential form.

In relation to FIG. 6, a common reference voltage source is indicated generally at 60, the constant output V1 therefrom being shown as being connected directly both to the Line DAC 34, and to the Field Correction DAC 35, and is shown as being connected to the Field DAC 36 via a known form of summing means indicated generally at 62. The varying analogue output $V_{y1}$ of the Field Correction DAC 35 is supplied to a positive input of the summing means 62, and is considered as providing the required compensating voltage indicated above, to be added to the constant output V1 of the reference voltage source 60 before the correspondingly varying reference voltage V1' is supplied to the Field DAC 36.

Attenuation means, not shown, may be provided between each DAC 34, 35 and 36, and the common voltage source 60, so that the appropriate reference voltages to cause a raster scan pattern of the same size, and shape, as the CRT screen 10 to be produced.

A suitable form of interface circuit between the output leads 38 from the Field DAC 36, carrying the analogue differential output from the DAC, and the Y deflection plates 16, is shown in FIG. 7. Each lead 38 is connected, individually to the base of a bipolar transistor T4. The collector of each transistor T4 is connected to a rail 70 maintained at the extra high voltage $V_{EHT}$ associated with the CRT, via a resistor R3. The Y deflection plates 16 are connected, individually, to a point 71 between a transistor T4 and the associated resistor R3, in order to have the differential signals from the Field DAC superimposed upon a desired, high common mode potential, corresponding to $V_{EHT}$, at the Y deflection plates 16. In order for the circuit to have an appropriate minimum gain, the emitter of each transistor T4, individually, is connected to a rail 72 maintained at zero potential, respectively, via a resistor R4. The minimum gain is then controlled by the ratio R3/R4. Connected in parallel with each other, between the points 73 between each transistor T4 and the associated resistor R4, is a variable resistor R5, so that the gain of the interference circuit can be adjusted. A capacitor C1 is also provided between the points 73 to compensate for the capacitance associated with the deflection plates 16.

Also indicated in FIG. 2 are dotted lines 26 which represent lines of equal times from the start of each raster scan period (t), the lines 26 being both for the uncorrected, truncated flute shaped raster scan pattern, and the desired rectangular raster scan pattern produced in response to the analogue outputs from the Line DAC 34, and the Field DAC 36, respectively, on the leads 37 and 38, in the arrangement of FIG. 3 as so far described. Conveniently, the lines 26 represent linear portions of the display, which are required to be straight, and to be parallel with each other, and to be uniformly spaced, in a similar manner to the raster line scans. Any deviation from such an arrangement of the lines 26 is representative of the distortion in the display due to the cause of the deviation of the arrangement of the lines 26, in a similar manner to the distortion caused by the uncorrected raster scan pattern referred to above. It can be considered, to a close approximation, that the dotted lines 26 are straight lines, extending at right angles to the X axis, or the longitudinal axis of symmetry, of the CRT screen 10. There are shown in FIG. 2 five lines 26 which are equi-distributed in time throughout each raster line scan period (t). It can be seen, however, that there is not the desired uniform spacing between the illustrated dotted lines 26, in relation to the CRT screen 10, and because of this the display provided would be distorted. From the start of each raster scan line period, the spacings on the CRT screen 10 between adjacent pairs of illustrated dotted lines 26 decreases in a non-uniform manner, because of the differences in the electron beam paths as the electron beam traverses the raster scan line, and as illustrated in FIG. 1. In order to correct for this distortion of the display it is necessary to arrange that the scanning speed of the electron beam along each raster scane line increases in a complementary, non-uniform manner, the variations in the scanning speed being the same for each raster scan line, when the lines 26 of equal times are considered to be straight lines. The required increases in scanning speed are obtained by providing corresponding increases in the potential differences $V_x$ of the differential signals applied to the X deflection plates 14, from the output of the Line DAC 34, uniformly for each raster line scan.

One way of obtaining such required non-linear increases in the scanning speed of the electron beam, uniformly for each raster line, is by arranging the Line DAC 34 to operate in accordance with a required non-linear function, the Line DAC still being driven by differential digital signals from the Line counter 31. This function is, at least substantially, exponential in form, an exponential function, to a close approximation, representing the required, corresponding, non-linear increases in the potential differences $V_x$ of the differential analogue signals to be applied to the X deflection plates 14. As indicated in FIG. 3, the exponential variation of the differential analogue signals $V_{x1}$ from the Line DAC, over any raster scan line period (t), and representative of corresponding exponential variations in the potential differences $V_x$ of differential analogue signals to be applied to the X deflection plates 14, can be represented by a graph, the shape of which graph is the inverse of the shape of the graph of the amount distortion of linear portions of the display parallel to the Y axis, otherwise obtained, in relation to the spacings of the linear display portions along the X axis of the CRT screen 10. Thus, the differential signals $V_{x1}$ vary from representing zero, to a maximum positive value, uniformly, over each raster line scan period (t).

The required non-linear output of the segmented Line DAC 34 is determined in an empirical manner, and is represented by the non-linear relationship between successive resistors R1 of the series of current sources 42 of the Line DAC. As described above in relation to FIG. 4, the Line DAC 34 has sixteen constituent segments, or current sources 42. In particular, several of the lower order resistors R1, within the series of resistors, are arranged to be infinite, so that the function, in accordance with which the Line DAC operates, initially has a significant portion representing a zero potential difference output $V_{x1}$ for the DAC. Then the stepped potential difference output of the DAC increases rapidly, in accordance with the required exponential function, the resistances within the current sources decreasing rapidly throughout the series of sixteen resistors R1.

The exponential function associated with the manner of operation of the Line DAC, and referred to above, is required to be combined with an appropriate linear function, generated in any convenient way, and similar to, but not identical with, the linear function described above in relation to the Field DAC, and to cause the Line DAC to provide each raster line scan.

Thus, the non-linear differential analogue output from the Line DAC 34, on the two leads 37, corrects for distortion due to the straight lines 26 of equal times, and which are equi-distributed in time throughout each raster line scan period, but not being uniformly spaced in relation to the CRT screen 10.

The use of the DAC's 34, 35 and 36, in correcting for distortion of the raster scan pattern, otherwise produced, is advantageous in that it enables the means to generate the required functions, to be employed to shape the waveforms to be applied to the deflection plates 14 and 16, to operate satisfactorily without having to consider the effects of variations in the operating temperatures of the means, or of variations in the supply voltage to drive the means. Conveniently, appropriate compensations for inadvertent variations of the operating temperature, and/or of the supply voltage, can be made at the outputs of the DAC's, and before the differential analogue outputs of the DAC's are applied to the deflection plates.

A flat screen CRT display system as described above may comprise any required form of information display system.

Alternatively, the flat screen CRT display system may comprise a TV receiver arranged to operate in accordance with a known transmission system, for example, the United States 525 display field line transmission system, or the European 625 display field line transmission system.

The operation of the DAC's 34, 35 and 36, can be considered as mapping, in a dynamic sense, any irregularity of the raster scan pattern otherwise produced on the screen 10 of the CRT tube, the DAC's operating to be the equivalent to an analogue memory in the respect. It is possible that each DAC operates in accordance with a function which has one, or more, non-linear components, and a linear component.

In general, but not strictly for an arrangement in accordance with the present invention, it can be considered that the combination of the Field DAC 36 and the Field Correction DAC 35 is capable of shifting pixels, of the raster scan pattern, possibly individually, parallel to the Y axis of the CRT screen 10, when the raster scan pattern varies along the X axis. Similarly, it can be considered that the Line DAC 34 is capable of shifting pixels, possibly individually, parallel to the X axis of the CRT screen 10, when there is otherwise distortion of the display produced, the amount of such distortion varying along the X axis, uniformly for each raster line scan.

It is possible to apply the output of the Line DAC 34 to integrating means generating a conventional raster line scan sawtooth waveform, so that the energy consumption of the arrangement is less than otherwise would be the case, the output of the Line DAC being in accordance solely with the non-linear function referred to above, and modifying in the required manner the sawtooth waveforms. Thus, the integrated output of the Line DAC encodes electron beam scanning speed, and not pixel positions, in relation to each raster line scan.

Because the Line DAC output is integrated, the subdivision system 45 is omitted in Line DAC 34, and, hence, the switches 47 are only two-way switches instead of the three-way switches otherwise required. Thus, the steps of the stepped analogue output from the Line DAC each represent multiples of pixel positions. Otherwise the Line DAC 34 operates in the manner described above for a segmented DAC. This manner of operation of the Line DAC is adequate.

Because the output from the Line DAC 34 is of a differential form, being provided on two leads 37, a suitable arrangement for appying the stepped, exponentially varying, output from the Line DAC 34 to the integrating means is shown, in general, in FIG. 8. Each constituent part of the differential output is supplied to an integrator 80, each integrator 80 comprising a capacitor C2 in parallel with an amplifier 02, and is arranged to have a time constant equal to the raster line scan period (t). The two integrated parts of the differential signal are then supplied, individually, to the two X deflection plates 14. Hence, the deflection signals supplied to the X deflection plates comprise a smoothly continuous waveform in each raster line scan period (t), the waveform varying in the desired way. The extra high voltage $V_{EHT}$ associated with the CRT is applied to each amplifier 02.

An alternative such arrangement, and in accordance with the present invention, is shown in FIG. 9.

The non-linear, differential, analogue output of the Line DAC, as described above, is applied to conventional sawtooth waveforms capable of causing raster line scans, in order to modify the waveforms to compensate for distortion in relation to the Y axis of the display, otherwise obtained.

High voltage, negative-going pulses are supplied from autotransformer means, indicated generally at 90, on a lead 91, in response to the pulses from the Line counter 31 also supplied to the Field counter 32, each negative-going pulse terminating when the Line counter 31 resets. Complementary, positive-going pulses are so supplied from the autotransformer means 90 on a lead 91'. The negative-going pulses are supplied via a diode D2 to a point 92 connected to one of the X deflection plates 14; and the positive-going pulses are supplied via a diode D3 to a point 92' connected to the other X deflection plate. Connected between points 92 and 93 is an integrator comprising an amplifier in the form of a PNP transistor T5, and a capacitor C2 in parallel therewith. Connected between points 92' and 93' is an integrator comprising an NPN transistor T5' and a capacitor C2' in parallel therewith. The collector of a PNP transistor T6 is connected to the point 92; and the collector of an NPN transistor T6' is connected to the point 93'. Between the points 93 and 93' is provided an NPN input transistor T7 in series with a resistor R6. The transistor T5 and T6 have their emitters connected to a rail 94 maintained at a low, positive supply voltage V3. The other such pair of transistors T5' and T6' have their emitters connected to a rail 95 maintained at zero potential. The collector of the transistors T5 and T5' are connected individually to the X deflection plates 14, and also, via the associated capacitor, respectively, C2 and C2', to the associated transistor, respectively, T6 and T6'. The bases of the transistors T5 and T5' are connected directly, respectively, to the collectors of the transistors T6 and T6'. The base of the transistor T6 is connected via a resistor R7 to the rail 94, and via a capacitor C3 to the lead 91. The base of the transistor T6' is connected via a resistor R7' to the rail 95, and via a capacitor C3' to the lead 91'.

The differential potential output $V_x$ from the Line DAC 34 is arranged to be in relation to the zero potential on the rail 95, and so, as applied to the transistor T7, is not to be of differential form, but instead comprises a varying voltage $V_x$, and is applied to the base of the input transistor T7 on one lead 37.

In operation, a negative-going pulse applied to the base of the transistor T6 through the capacitor C3 causes the transistor T6 to become conducting, and thereby effectively connecting one electrode of the capacitor C2 to the rail 94. The other electrode of the capacitor C2 is held at the negative-going peak voltage on the lead 91 by virtue of the connection through the diode D2. In this way, the negative-going pulse establishes a charge on the capacitor C2. In a similar way a positive-going pulse on the lead 91' establishes a corresponding charge on the capacitor C2'. At the end of each pulse on the leads 91 and 91' current $i_f$ flows through the emitter-collector path of the transistor T7 and the resistor R6, between the base of the transistor T5 and the base of the transistor T5'. These transistors with their feedback capacitors C2 and C2' then act as integrators and the collector voltages of the transistors execute positive-going and negative-going ramps respectively as the charges on their associated capacitors are changed by the common current $i_f$ through the path joining the base electrodes of the transistors. The output of the Line DAC on the lead 37 controls the conductivity of the transistor T7 while the ramps are being described so that the particular shaping required to produce the desired raster line scan, with the distortion corrected, is provided. By virtue of the fact that the description of the ramps produced by the two integrators is controlled by a common current path from one integrator to the other, it follows that the control of the two ramps in the required balanced manner is easily effected and the required non-linearities are easily introduced into both waveforms.

It is possible that such integrating means is provided between the Field DAC 36 and Y deflection plates 16, instead of the arrangement shown in FIG. 7. Such an arrangement may be provided in a CRT display system in accordance with the present invention instead of, or in addition to, the integrating means provided between the Line DAC 34 and the X deflection plates 14, and may be at least substantially the same as the integrating means between the Line DAC and the X deflection plates.

What we claim is:

1. A cathode ray tube (CRT) display system including distortion correction means for the CRT having digital means arranged to provide digital output signals to drive at least one digital-to-analogue converter (DAC), in response, said at least one DAC being arranged to generate a function, to shape the waveforms of deflection signals to be applied to one pair of deflection plates of the CRT, partially to cause a conventional raster scan pattern co-incident with the CRT screen, the digital means providing digital output signals, in response, the DAC being arranged to generate the function, respresentative of variations of the corresponding analogue output from the DAC, the analogue output of the DAC being applied to the associated pair of deflection plates of the CRT via integrating means, the integrating means including two integrators, each integrator including an amplifier and a feedback capacitor, there also being provided means to supply pulses, negative-going pulses to be supplied to one integrator, and positive-going pulses to be supplied to the other integrator, in operation, and when the pulses are removed, in response to an appropriate signal from the digital means, current flowing from the capacitor of said one integrator to the capacitor of said other integrator, and the arrangement being such that a positive-going voltage ramp is applied to one deflection plate, and a negative-going voltage ramp is applied to the other deflection plate, of the required sawtooth waveforms to be applied to the deflection plates, and the current flowing between the two capacitors is arranged to flow through an input bipolar transistor, and a resistor, the varying analogue output from the DAC causing a potential, in relation to a datum reerence potential, to be applied to the base of the input transistor, so that the varying analogue output applied to the base of the input transistor causes corresponding variations of the sawtooth waveforms, to cause distortion of the raster scan pattern, otherwise obtained, to be corrected.

2. A CRT display system as claimed in claim 1 in which said at least one DAC is arranged to shape the waveform of deflection signals for the X deflection plates of the CRT, to cause each raster scan line.

3. A CRT display system as claimed in claim 1 in which a second DAC is provided, the second DAC being arranged, in response to being driven by digital output signals from the digital means, to generate a function to shape the waveforms of deflection signals to be applied, via integrating means, to the other pair of deflection plates of the CRT, to cause the completion of the conventional raster scan pattern coincident with the CRT screen.

4. A CRT display system as claimed in claim 1 in which the digital means arranged to drive said at least one DAC comprises an oscillator having an output with a constant pulse repetition rate associated therewith, and arranged to be supplied to at least one counter, in response, said at least one counter to supply the required digital signals to the DAC, the counter being arranged to be reset after each appropriate constituent period of the associated raster scan pattern.

5. A CRT display system as claimed in claim 4 in which each appropriate signal from the digital means to the pulse generating means is in response to the counter resetting.

6. A CRT display system as claimed in claim 1 in which said at least one DAC has the so-called segmented form.

7. A CRT display system as claimed in claim 6 in which the DAC is arranged to provide an analogue current output, each constituent segment of the DAC comprising a current source.

8. A CRT display system as claimed in claim 7, in which each current source includes a bipolar transistor in series with a resistor, and wherein the function generated by the DAC is determined by the relationship of a series of resistors, each resistor of said series being part of a corresponding one of said current sources.

9. A CRT display system as claimed in claim 1 in which the pulse generating means comprises autotransformer means.

10. A CRT display system as claimed in claim 1 wherein the CRT is a flat screen CRT having an electron beam gun assembly extending parallel to a plane in which a screen surface of the CRT is disposed.

* * * * *